(12) United States Patent
Keipert (10) Patent No.: US 8,945,252 B2
(45) Date of Patent: Feb. 3, 2015

(54) COATED ABRASIVE LAMINATE DISC AND METHODS OF MAKING THE SAME

(75) Inventor: Steven J. Keipert, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1265 days.

(21) Appl. No.: 12/669,802

(22) PCT Filed: Aug. 7, 2008

(86) PCT No.: PCT/US2008/072405
§ 371 (c)(1),
(2), (4) Date: Jan. 20, 2010

(87) PCT Pub. No.: WO2009/023499
PCT Pub. Date: Feb. 19, 2009

(65) Prior Publication Data
US 2010/0203282 A1    Aug. 12, 2010

Related U.S. Application Data (60) Provisional application No. 60/955,418, filed on Aug. 13, 2007.

(51) Int. Cl.
| | | |
|---|---|---|
| *B24D 3/02* | (2006.01) | |
| *C09C 1/68* | (2006.01) | |
| *C09K 3/14* | (2006.01) | |
| *B32B 7/12* | (2006.01) | |
| *B24D 5/08* | (2006.01) | |
| *B24D 5/12* | (2006.01) | |

(52) U.S. Cl.
CPC ... *B32B 7/12* (2013.01); *B24D 5/08* (2013.01); *B24D 5/12* (2013.01)

USPC ............ 51/309; 51/297; 428/99; 428/138; 428/143

(58) Field of Classification Search
None
See application file for complete search history.

(56) References Cited

U.S. PATENT DOCUMENTS

| | | | | |
|---|---|---|---|---|
| 3,014,795 A | * | 12/1961 | Schmidlin | 51/297 |
| 3,316,212 A | * | 4/1967 | Angelo et al. | 51/298 |
| 3,598,773 A | * | 8/1971 | Mitchell et al. | 24/797 |
| 4,214,877 A | * | 7/1980 | Pemrick | 51/295 |
| 4,240,807 A | | 12/1980 | Kronzer | |
| 4,437,269 A | * | 3/1984 | Shaw | 51/296 |
| 4,708,891 A | | 11/1987 | Ito et al. | |

(Continued)

FOREIGN PATENT DOCUMENTS

| | | |
|---|---|---|
| GB | 1 475 986 | 6/1977 |
| JP | 54-054388 | 4/1979 |

(Continued)

OTHER PUBLICATIONS

PCT/US2008/072405, International Search Report, Nov. 6, 2008.

(Continued)

*Primary Examiner* — Kaj K Olsen
*Assistant Examiner* — Ross J Christie
(74) *Attorney, Agent, or Firm* — Bradford B. Wright (57) ABSTRACT

A coated abrasive laminate disc (100) has a backing (120) with glass (125) and woven fabrics (124) laminated with a thermoplastic adhesive (122) having a melting onset temperature in a range of from about 140° C. to 190° C. and comprising polyamide and/or polyurethane. Methods of making are the coated abrasive laminate discs (100) are also disclosed.

10 Claims, 1 Drawing Sheet

(56) References Cited

U.S. PATENT DOCUMENTS

| | | | | |
|---|---|---|---|---|
| 4,751,138 | A | 6/1988 | Tumey et al. | |
| 5,152,917 | A | 10/1992 | Pieper et al. | |
| 5,286,541 | A | 2/1994 | Darjee et al. | |
| 5,316,812 | A | 5/1994 | Stout et al. | |
| 5,417,726 | A * | 5/1995 | Stout et al. | 51/293 |
| 5,435,816 | A | 7/1995 | Spurgeon et al. | |
| 5,436,063 | A | 7/1995 | Follett et al. | |
| 5,454,844 | A | 10/1995 | Hibbard et al. | |
| 5,573,619 | A | 11/1996 | Benedict et al. | |
| 5,580,634 | A | 12/1996 | Stout et al. | |
| 5,609,706 | A * | 3/1997 | Benedict et al. | 451/532 |
| 5,672,097 | A | 9/1997 | Hoopman | |
| 5,681,217 | A | 10/1997 | Hoopman et al. | |
| 5,766,277 | A | 6/1998 | DeVoe et al. | |
| 5,851,247 | A | 12/1998 | Stoetzel et al. | |
| 5,961,674 | A | 10/1999 | Gagliardi et al. | |
| 5,975,988 | A | 11/1999 | Christianson | |
| 6,077,601 | A | 6/2000 | DeVoe et al. | |
| 6,139,594 | A | 10/2000 | Kincaid et al. | |
| 6,228,133 | B1 | 5/2001 | Thurber et al. | |
| 6,261,328 | B1 | 7/2001 | Champagne | |
| 6,638,601 | B1 * | 10/2003 | Follensbee | 51/297 |
| 6,776,868 | B2 * | 8/2004 | Follensbee | 51/295 |
| 6,843,815 | B1 | 1/2005 | Thurber et al. | |
| 6,936,083 | B2 | 8/2005 | Thurber et al. | |
| 7,150,770 | B2 | 12/2006 | Keipert et al. | |
| 7,150,771 | B2 | 12/2006 | Keipert et al. | |
| 7,344,574 | B2 | 3/2008 | Thurber et al. | |
| 7,344,575 | B2 | 3/2008 | Thurber et al. | |
| 8,066,786 | B2 * | 11/2011 | Keipert et al. | 51/297 |
| 2003/0205320 | A1 * | 11/2003 | Follensbee | 156/280 |
| 2005/0120636 | A1 | 6/2005 | Kim | |
| 2006/0010780 | A1 * | 1/2006 | Hall et al. | 51/293 |
| 2006/0026905 | A1 | 2/2006 | Kim | |
| 2006/0265966 | A1 | 11/2006 | Rostal et al. | |
| 2006/0265967 | A1 | 11/2006 | Follensbee et al. | |
| 2006/0288647 | A1 | 12/2006 | Thurber et al. | |
| 2006/0288648 | A1 | 12/2006 | Thurber et al. | |
| 2008/0102720 | A1 | 5/2008 | Rostal et al. | |
| 2008/0152856 | A1 | 6/2008 | Keipert et al. | |

FOREIGN PATENT DOCUMENTS

| | | |
|---|---|---|
| JP | 62-140769 | 6/1987 |
| JP | 2001-512057 | 8/2001 |
| JP | 2004-511356 | 4/2004 |
| WO | WO 99/06182 | 2/1999 |
| WO | WO 00/37569 A1 | 6/2000 |

OTHER PUBLICATIONS

PCT/US2008/072405, Written Opinion of the International Searching Authority, Nov. 6, 2008.

Product Literature, "Stevens Urethane Film and Sheet", © 1997-2000, Stevens Urethane, Holyoke, Massachusetts, pp. 1-5.

* cited by examiner

COATED ABRASIVE LAMINATE DISC AND METHODS OF MAKING THE SAME

CROSS-REFERENCE TO RELATED APPLICATIONS

This application is a national stage filing under 35 U.S.C. §371 of PCT/US2008/072405, filed Aug. 7, 2008, which claims priority to U.S. Provisional Application Ser. No. 60/955,418, filed Aug. 13, 2007, the disclosure of which is incorporated by reference in its entirety herein.

BACKGROUND

In general, coated abrasive laminate discs have abrasive particles secured to a backing. Typically, coated abrasive laminate discs comprise a backing having two opposed major surfaces and an abrasive layer secured to one of the major surfaces. The abrasive layer typically comprises abrasive particles and a binder that secures the abrasive particles to the backing.

One common type of coated abrasive laminate disc has an abrasive layer formed of a make layer, a size layer, and abrasive particles. In making such a coated abrasive laminate disc, a curable make layer precursor is typically applied to a major surface of a backing and optionally partially cured. Abrasive particles are then at least partially embedded into the (optionally partially cured) curable make layer precursor, and the make layer precursor is sufficiently cured to provide a make layer that secures the abrasive particles to the backing. A curable size layer precursor is then applied over the make layer and abrasive particles, followed by sufficient curing of the size layer precursor to provide a size layer.

Another common type of coated abrasive laminate disc comprises an abrasive layer secured to a major surface of a backing, wherein the abrasive layer is provided by applying a slurry having a curable binder precursor and abrasive particles onto a major surface of a backing, and then sufficiently curing the binder precursor to form an abrasive layer.

Coated abrasive laminate discs may further comprise a supersize layer covering the abrasive layer. The supersize layer typically includes grinding aids and/or antiloading materials.

Backings used in coated abrasive laminate discs may be treated with one or more applied coatings. Examples of typical backing treatments are a backsize (that is, a coating on the major surface of the backing opposite the abrasive layer), a presize or a tie layer (that is, a coating on the backing disposed between the abrasive layer and the backing), and/or a saturant that saturates the backing. A subsize is similar to a saturant, except that it is applied to a previously treated backing.

SUMMARY

In one aspect, the present invention provides a coated abrasive laminate disc comprising:
a backing disc, the backing disc comprising:
a woven fabric;
a glass fabric comprising glass fibers having a first fabric treatment comprising a first saturant; and
a thermoplastic laminating adhesive disposed between the woven fabric and glass fabric, the thermoplastic laminating adhesive securing the woven fabric to the glass fabric, wherein the thermoplastic laminating adhesive has a melting onset temperature in a range of from about 140° C. to 190° C., inclusive, and comprises:
a polyamide having a tensile strength according to ISO 527 of at least 20 megapascals; or
a polyurethane having a Shore A durometer of at least 87; or
a combination thereof; and
an abrasive layer secured to the backing proximate to the woven fabric, the abrasive layer comprising at least one binder and abrasive particles.

In some embodiments, the abrasive layer comprises a make layer and a size layer. In some embodiments, the coated abrasive laminate disc further comprises a supersize layer overlaying at least a portion of the size layer. In some embodiments, the glass fabric is a woven glass fabric. In some embodiments, the glass fabric has a basis weight of from 2 to 20 ounces per square yard. In some embodiments, the woven fabric comprises polyester. In some embodiments, woven fabric has a basis weight of from 2 to 20 ounces per square yard. In some embodiments, the woven fabric further comprises a second fabric treatment selected from the group consisting of: a backsize, a presize, a second saturant, and combinations thereof. In some embodiments, the backing disc has a thickness of from 10 to 100 mils. In some embodiments, the backing disc further has a central opening therein. In some embodiments, the abrasive disc further comprises a centrally located attachment device affixed to the glass fabric. In some embodiments, the laminating adhesive comprises the polyamide.

Coated abrasive laminate discs according to the present invention may be made by a variety of useful methods.

Accordingly, in another aspect, the present invention provides a method of making a coated abrasive laminate disc, the method comprising:
providing a backing, the backing comprising:
a woven fabric;
a glass fabric comprising glass fibers and having a first saturant therein; and
a thermoplastic laminating adhesive disposed between the woven fabric and glass fabric, the thermoplastic laminating adhesive securing the woven fabric to the glass fabric, wherein the thermoplastic laminating adhesive has a melting onset temperature in a range of from about 140° C. to 190° C., inclusive, and comprises:
a polyamide having a tensile strength according to ISO 527 of at least 20 megapascals; or
a polyurethane having a Shore A durometer of at least 87; or
a combination thereof; and
forming an abrasive layer on the backing proximate and secured to the woven fabric, the abrasive layer comprising at least one binder and abrasive particles to provide a coated abrasive laminate; and
converting the coated abrasive laminate into the coated abrasive laminate disc.

In yet another aspect, the present invention provides a method of making a coated abrasive laminate disc, the method comprising:
providing a backing disc, the backing disc comprising:
a woven fabric;
a glass fabric comprising glass fibers and having a first saturant therein; and
a thermoplastic laminating adhesive disposed between the woven fabric and glass fabric, the thermoplastic laminating adhesive securing the woven fabric to the glass fabric, wherein the thermoplastic laminating adhesive has a melting onset temperature in a range of from about 140° C. to 190° C., inclusive, and comprises:

a polyamide having a tensile strength according to ISO 527 of at least 20 megapascals; or a polyurethane having a Shore A durometer of at least 87; or a combination thereof; and forming an abrasive layer on the backing disc proximate and secured to the woven fabric, the abrasive layer comprising at least one binder and abrasive particles to provide the coated abrasive laminate disc.

In yet another aspect, the present invention provides a method of making a coated abrasive laminate disc, the method comprising:

providing a coated abrasive article comprising:
a woven fabric; and
an abrasive layer proximate and secured to the woven fabric, the abrasive layer comprising at least one binder and abrasive particles; and laminating the first coated abrasive article to a glass fabric comprising glass fibers and having a first saturant therein, using a thermoplastic laminating adhesive to provide a coated abrasive laminate, wherein the thermoplastic laminating adhesive has a melting onset temperature in a range of from about 140° C. to 190° C., inclusive, and comprises:

a polyamide having a tensile strength according to ISO 527 of at least 20 megapascals; or a polyurethane having a Shore A durometer of at least 87; or a combination thereof; and converting the coated abrasive laminate into the coated abrasive laminate disc.

In yet another aspect, the present invention provides a method of making a coated abrasive laminate disc, the method comprising:

providing a coated abrasive disc comprising:
a woven fabric; and
an abrasive layer proximate and secured to the woven fabric, the abrasive layer comprising at least one binder and abrasive particles; and laminating the first coated abrasive article to a glass fabric disc comprising glass fibers and having a first saturant therein, using a thermoplastic laminating adhesive to provide the coated abrasive laminate disc, wherein the thermoplastic laminating adhesive has a melting onset temperature in a range of from about 140° C. to 190° C., inclusive, and comprises:

a polyamide having a tensile strength according to ISO 527 of at least 20 megapascals; or a polyurethane having a Shore A durometer of at least 87; or a combination thereof.

In some embodiments, the methods further comprise overlaying a supersize layer on at least a portion of the size layer. In some embodiments, the methods further comprise providing a central opening in the coated abrasive laminate disc. In some embodiments, the methods further comprise affixing a centrally located attachment device to the coated abrasive laminate disc. In some embodiments, the methods further comprise thermoforming the coated abrasive laminate disc.

Coated abrasive laminate discs according to the present invention are useful for abrading a workpiece, and exhibit resistance to delamination during heavy use, typically while achieving useful levels of other abrasive properties such as high cut, long life, and low shelling.

As used herein, the term "ISO 527" refers to International Organization for Standardization (ISO) test method ISO 527-3:1995 "Plastics—Determination of tensile properties—Part 3: Test conditions for films and sheets" as modified by Technical Corrigendum 1:1998 and Technical Corrigendum 2:2001;

the term "disc" refers to an object having a shape that is generally flat, thin, and having a generally circular circumference, and includes both circular circumferences and variations in the circumference such as, for example, scalloped or elliptical shapes.

the term "woven fabric" includes knitted or crocheted fabrics and/or woven fabrics; the term "nonwoven fabric" refers to a fabric that is not a woven fabric;

the term "thermoplastic" means having the property of softening or fusing when heated and of hardening and becoming rigid again when cooled (thermoplastic materials can typically be re-melted and cooled time after time without undergoing appreciable chemical change);

the term "thermosetting" means having the property of becoming permanently hardened (for example, by a chemical crosslinking reaction) when heated or otherwise cured;

the term "polyurethane" includes polymers containing repeated subunits with carbamate (that is, —OC(=O)NH—) and/or urea (that is, —HNC(=O)NH—) backbone functionality; and the term "polyamide" refers to polymers containing repeated subunits with amide backbone functionality.

DETAILED DESCRIPTION

Figure 1:
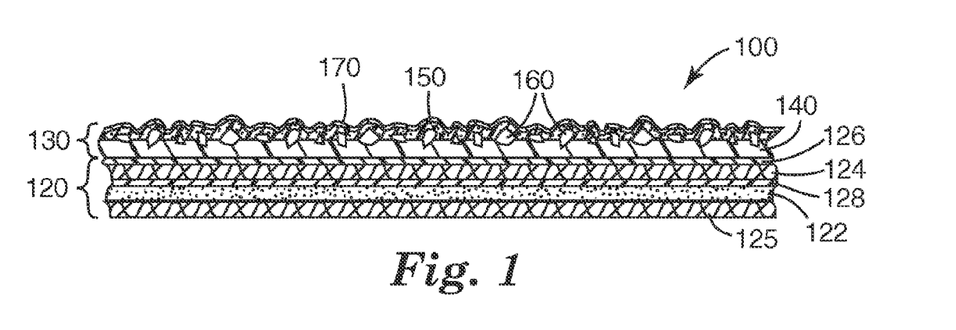
FIG. 1 is a cross-sectional schematic side view of an exemplary coated abrasive laminate disc according to the present invention.

Referring now to FIG. 1, exemplary coated abrasive laminate disc 100 has abrasive layer 130 secured to backing disc 120. Abrasive layer 130, secured to backing disc 120, has make layer 140, size layer 150, and abrasive particles 160. Optional supersize layer 170 overlays size layer 150. Backing disc 120 comprises woven fabric 124, glass fabric 125 permeated with saturant (not shown), and thermoplastic laminating adhesive 122 disposed between woven fabric 124 and glass fabric 125. Woven fabric 124 has optional presize 126 and backsize 128 disposed thereon.

In some embodiments, the abrasive layer comprises make and size layers that secure the abrasive particles to the backing disc. The make and size layers may comprise any binder resin that is suitable for use in abrading applications. Many useful binder resins are known and include phenolic binders, acrylic binders, epoxy binders, isocyanurate binders, urea-formaldehyde binders, aminoplast binders, and combinations thereof. The binder resins are generally prepared by at least partially curing (that is, crosslinking) a corresponding curable binder precursor; for example, free-radically polymerizable monomer and/or oligomers, epoxy resins, phenolic resins, aminoplast resins, urea-formaldehyde resins, isocyanurate resins, and combinations thereof, typically in the presence of suitable curative (for example, photoinitiator, catalyst, crosslinker, etc.) which are well known in the art. The make and size layers may include other conventional components in combination with the binder such as, for example, coupling agents, fibers, lubricants, plasticizers, suspending agents, wetting agents, fillers, surfactants, grinding aids, dyes, and pigments.

Typically, the make layer is prepared by coating at least a portion of the woven cloth (treated or untreated), typically before converting it into a backing disc, with a make layer precursor comprising a suitable binder precursor. Abrasive particles are then at least partially embedded (for example, by electrostatic coating) in the make layer precursor, and the make layer precursor is at least partially cured. The make layer precursor is typically partially cured prior to coating with abrasive particles and further cured at a later point in the manufacturing process, although this is not a requirement. Next, the size layer is prepared by coating at least a portion of the make layer and abrasive particles with a size layer precursor, comprising a suitable binder precursor (which may be the same as, or different from, the binder precursor used in the make layer precursor), and at least partially curing the size layer precursor.

Suitable abrasive particles are well known in the abrasive art and include for example, fused aluminum oxide, heat treated aluminum oxide, semi-friable aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, sol gel abrasive particles, silica, iron oxide, chromia, ceria, zirconia, titania, silicates, metal carbonates (such as calcium carbonate (for example, chalk, calcite, marl, travertine, marble and limestone), calcium magnesium carbonate, sodium carbonate, magnesium carbonate), silica (for example, quartz, glass beads, glass bubbles and glass fibers) silicates (for example, talc, clays, (montmorillonite) feldspar, mica, calcium silicate, calcium metasilicate, sodium aluminosilicate, sodium silicate) metal sulfates (for example, calcium sulfate, barium sulfate, sodium sulfate, aluminum sodium sulfate, aluminum sulfate), gypsum, aluminum trihydrate, graphite, metal oxides (for example, tin oxide, calcium oxide), aluminum oxide, titanium dioxide) and metal sulfites (for example, calcium sulfite), metal particles (for example, tin, lead, copper), plastic abrasive particles formed from a thermoplastic material (for example, polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), plastic abrasive particles formed from crosslinked polymers (for example, phenolic resins, aminoplast resins, urethane resins, epoxy resins, acrylate resins, acrylated isocyanurate resins, urea formaldehyde resins, isocyanurate resins, acrylated urethane resins, acrylated epoxy resins), and combinations thereof.

The abrasive particles may have any size (for example, in a size range of from 0.1 to 5000 micrometers) and may correspond to industry recognized grades such as, for example, ANSI (American National Standard Institute), FEPA (Federation of European Producers of Abrasives), or JIS (Japanese Industrial Standard).

In one method of making coated abrasive laminate discs according to the present invention, a curable make layer precursor is applied to the, typically presize-treated, surface of the woven fabric.

The basis weight (on a solids basis) of the make layer precursor utilized may depend, for example, on the intended use(s), type(s) of abrasive particles, and nature of the coated abrasive laminate disc being prepared, but generally will be in a range of from 1, 2, or 5 g/m$^2$ to 20, 25, 400, or even 600 g/m$^2$. The make layer precursor may be applied by any known coating method for applying a make layer precursor to a backing, including, for example, roll coating, extrusion die coating, curtain coating, knife coating, gravure coating, and spray coating. After applying the curable make layer precursor to the presize-treated surface of the woven fabric, and prior to solidification of the curable make layer precursor (for example, by curing), abrasive particles are deposited onto the make layer precursor. Coating weights for the abrasive particles may depend, for example, on the specific coated abrasive laminate disc desired, the process for applying the abrasive particles, and the size of the abrasive particles, but typically range from 1 to 2000 g/m$^2$. If desired, the curable make layer precursor may be partially cured prior to deposition of the abrasive particles on the make layer precursor. Following deposition of the abrasive particles, the make layer precursor is at least partially cured to provide a make layer. Curing may be accomplished by any suitable means (for example, heat, microwave radiation, ultraviolet and/or visible radiation, electron beam), typically depending on the choice of curable make layer precursor).

A curable size layer precursor is applied onto at least a portion of the make layer and abrasive particles, and at least partially cured to provide a size layer. Curing may be accomplished by any suitable means (for example, heat, microwave radiation, ultraviolet and/or visible radiation, electron beam), typically depending on the choice of size layer precursor). The basis weight of the size layer precursor (on a solids basis) will typically vary depending on the intended use(s), type(s) of abrasive particles, and nature of the coated abrasive laminate disc being prepared, but generally will be in the range of from 1 or 5 g/m$^2$ to 300, or even 800 g/m$^2$, or more. The size layer precursor may be applied by any known coating method for applying a size layer to a backing including, for example, roll coating, extrusion die coating, curtain coating, and spray coating.

In some embodiments, the abrasive layer comprises abrasive particles dispersed in a binder, commonly referred to as a slurry coat. Slurry coats may be structured (for example, have a predetermined topographical surface) or unstructured.

Typically, the slurry layer is prepared by coating at least a portion of the woven cloth (treated or untreated), typically before converting it into a backing disc, with a curable binder precursor having abrasive particles dispersed therein. The binder precursor is then, typically, at least sufficiently cured to provide an abrasive layer.

Optionally, a supersize may be overlaid on at least a portion of the size layer or slurry layer. The supersize may include one or more optional components in combination with the binder such as, for example, coupling agents, fibers, lubricants, plasticizers, suspending agents, wetting agents, fillers, surfactants, grinding aids, dyes, and pigments.

Coated abrasive articles suitable for preparing coated abrasive laminate discs comprising abrasive particles and make, size, and supersize layers, are well known and are described, for example, in U.S. Pat. No. 5,436,063 (Follett et al.); U.S. Pat. No. 5,961,674 (Gagliardi et al.); U.S. Pat. No. 4,751,138 (Tumey et al.); U.S. Pat. No. 5,766,277 (DeVoe et al.); U.S. Pat. No. 6,077,601 (DeVoe et al.); U.S. Pat. No. 6,228,133 (Thurber et al.); and U.S. Pat. No. 5,975,988 (Christianson), the disclosures of which are incorporated herein by reference. Coated abrasive articles suitable for preparing coated abrasive laminate discs with slurry coats, are well known and are described, for example, in U.S. Pat. No. 5,152,917 (Pieper et al.); U.S. Pat. No. 5,435,816 (Spurgeon et al.); U.S. Pat. No. 5,672,097 (Hoopman); U.S. Pat. No. 5,681,217 (Hoopman et al.); U.S. Pat. No. 5,454,844 (Hibbard et al.); U.S. Pat. No.

5,851,247 (Stoetzel et al.); and U.S. Pat. No. 6,139,594 (Kincaid et al.); the disclosures of which are incorporated herein by reference.

The woven fabric comprises woven fibers and blends thereof. Examples of useful fibers include polyester, cotton, polyester/cotton blends, rayon, acrylic, polyamide, polyolefin, carbon fibers, glass fibers, polyimide fibers, and combinations thereof.

Typically, the woven fabric has a basis weight in a range of from 2 to 20 ounces (oz) per square yard (70 to 680 grams per square meter (that is, $g/m^2$)), for example, a basis weight of from 4 to 15 ounces per square yard (140 to 510 $g/m^2$) or even a basis weight of from 5 to 13 ounces per square yard (170 to 360 $g/m^2$); although other basis weights may be used.

Optional presize treatments on woven fabric backings typically enhance the bonding between the backing and the abrasive make resin, and level the irregular weave pattern of the fabric. The optional presize is typically applied to the woven fabric by coating a suitable curable presize precursor onto the woven fabric, followed by sufficient curing (for example, by heating or exposure to actinic radiation) to convert the curable presize precursor to a presize. The optional presize may comprise any material suitable as a presize for a woven fabric, including for example, an at least partially cured phenolic, aminoplast or epoxy resin or combinations thereof. Optional presize resins may be modified by the addition of fillers and by the addition of polymer latexes, plasticizing additives or combinations thereof.

If used, the optional presize is typically applied to the woven fabric by any suitable means, including, for example, roll coating (for example, using soft rubber rolls), spraying, transfer coating, dip coating, screen printing, gravure coating, curtain coating, bar coating, knife coating, or die coating. Typically, add on weights of the optional presize are in a range of from 0.1 to 400 $g/m^2$, although higher and lower coating weights may be used. To promote adhesion of presize to the woven fabric, the woven fabric may be modified by known methods including corona discharge, ultraviolet light exposure, electron beam exposure, flame discharge, and/or scuffing.

Optionally, for example, in those embodiments wherein a pre-existing coated abrasive material is laminated to a glass fabric, the woven fabric may have a backsize thereon. The optional backsize may comprise any material suitable as a backsize for woven fabrics including, for example, phenolics (for example, $CaCO_3$-filled phenolics), aminoplasts (for example, $CaCO_3$-filled aminoplasts), epoxies, and combinations thereof.

Optionally, the woven fabric may be treated with a saturant that permeates the woven fabric. Examples of saturants for the woven fabric include phenolics (for example, latex modified phenolics), aminoplasts, epoxies, and combinations thereof.

The glass fabric comprises glass fibers and may be, for example, woven or nonwoven. Typically, the glass fabric has a basis weight of from 2 to 20 ounces per square yard (70 to 680 $g/m^2$), for example, a basis weight of from 4 to 15 ounces per square yard (140 to 510 $g/m^2$), or even a basis weight of from 5 to 13 ounces per 10 square yard (170 to 360 $g/m^2$); however, other basis weights may be used.

The glass fabric has a fabric treatment comprising a saturant that serves to bind, strengthen, stiffen and dimensionally stabilize the glass fabric as well as to reduce the tendency for the glass fibers to fracture when flexed. Typically, the saturant is added to the woven glass fabric at an add-on weight of from 1 to 50 percent based on the glass fabric weight; for example, from 10 to 30 percent based on the glass fabric weight, or even 15 to 25 percent based on the glass fabric weight, although other amounts of saturant may also be used. Examples of suitable saturants include phenolics, aminoplasts, epoxy resins, and combinations thereof.

Typically, the saturant is applied to the glass fabric as a curable saturant precursor in a substantially fluid state (optionally in a solvent), which is then at least partially cured (that is, at least partially crosslinked) by application of energy (for example, heat or radiation). Typically, the saturant permeates the glass fabric at an add-on weight (based on solids) of from 1 to 99 percent based on the glass fabric weight; for example, from 10 to 50 percent based on the glass fabric weight, or even 15 to 40 percent based on the glass fabric weight, although other amounts of saturant may also be used. To improve wetting and adhesion of the saturant to the glass fabric, the glass fabric may incorporate one or more surface treatments such as, for example, silane treatments. Wetting agents and surfactants may also be incorporated into the saturating resins.

Optionally, though not typically used, the glass fabric may have additional fabric treatments such as, for example, a presize, subsize, and/or backsize (for example, as discussed above in relation to the woven fabric).

Examples of useful glass fabric weave types include plain weave, four harness satin (crowfoot), eight harness satin and twill weave. Commercial sources include, for example, JPS Glass, Slater, S.C.; Owens Corning, Toledo, Ohio; and BGF Industries, Greensboro, N.C.

Examples of useful nonwoven glass fabrics include continuous strand mats, chopped strand mats, bonded mats, air-laid webs and felts. Sources include Owens Corning, Toledo, Ohio.

The thermoplastic laminating adhesive has a melting onset temperature between 140 and 190° C., inclusive. Melting temperatures below 140° C. may result in the softening or re-melting of the adhesive due to the heat generated during heavy, continuous use of the coated abrasive laminate disc. Melting onset temperatures above 190° C. are difficult to process during the backing lamination without degrading the properties of the other backing or resin components. For durability and resistance to laminate bond failure, a tensile strength of at least 20 megapascals is generally desirable.

The thermoplastic laminating adhesive comprises a polyamide having a tensile strength according to ISO 527 of at least 20 megapascals (MPa); or a polyurethane having a Shore A durometer of at least 87; or a combination thereof.

Examples of useful polyamides for inclusion in laminating adhesives include nylons (for example, nylon 12, nylon 6,12) and blends thereof, nylon copolymers, and blends thereof. A wide variety of suitable polyamides, marketed for use as high temperature hot melt adhesives, are available commercially. Exemplary commercial vendors of hot melt polyamides include EMS Chemie of Sumter, S.C., and Bostik, Wauwatosa, Wis.

While a tensile strength of at least 20 MPa is generally necessary to achieve a useful level of performance, higher tensile strengths (for example, at least 25 or even at least 30 MPa) may tend further enhance backing performance.

Examples of useful polyurethanes adhesives include thermoplastic polyurethanes formed by the reaction of diisocyanates or their functional equivalents, with diols and/or diamines to give substantially linear thermoplastic polyurethanes, commonly referred to in the polyurethane art as TPUs.

Examples of useful thermoplastic polyurethanes include those based on polyether diols and polyester diols and incorporating isocyanates such as toluene diisocyanate and bis(4-isocyanatophenyl)methane. Polyurethanes made by the reaction of difunctional isocyanate prepolymers with diol or diamine curatives are also useful. Suitable polyurethanes are available commercially for use as high temperature hot melt adhesives. Exemplary commercial sources include Stevens Urethanes, Sumter S.C.; BASF, Wyandotte, Mich.; Huntsman Polyurethanes, The Woodlands, Tex.; Dow Chemical Co., Midland, Mich.

While a Shore A durometer of at least 87 is generally necessary to achieve a useful level of performance, higher Shore A durometer values (for example, at least 90 or even at least 100) may tend further enhance backing performance.

The thermoplastic laminating adhesive may be conveniently used as a film having a thickness of from 1 to 10 mils (0.025 to 0.25 mm); for example, from 2 to 8 mils (0.051 to 0.20 mm), or even from 3-6 mils (0.076 to 0.15 mm), although other thickness may also be used. Further, the thermoplastic laminating adhesive may be supplied to the backing components in other forms such as, for example, extruded or sprayed as a molten fluid or applied as a powder. Typically, the thermoplastic laminating adhesive is bonded to the glass and woven fabrics using sufficient heat and pressure (for example, using a heated press or belt laminator) to melt the thermoplastic laminating adhesive and ensure a strong adhesive bond in the resultant laminated article, followed by cooling the molten thermoplastic laminating adhesive to solidify it. Typically, pressure is maintained throughout at least a portion the cooling stage of the lamination process. Lamination may be done as a batch or continuous process.

The woven fabric and glass fabric may be laminated together prior to providing the abrasive layer on the woven fabric, for example, as described above. Alternatively, the woven fabric may be provided as part of a pre-existing coated abrasive material and the glass fabric laminated thereto.

Various properties of the backing disc may be advantageously adjusted to provide desirable working attributes. For example, the backing disc should generally have sufficient breaking strength to prevent rotational failure (for example, at least 300 pounds per inch width (53.6 kg per cm width), more typically in a range of from 800 to 2000 pounds per inch width (53.6 to 357 kg per cm width)), although this is not a requirement. Similarly, the backing disc should typically have a Young's modulus of at least 500,000 pounds per square inch (3500 MPa) (for example, in a range of from 500,000 to 20,000,000 pounds per square inch (3500 to 138000 MPa)), although this is not a requirement. In addition, to facilitate operator handling, the flex modulus of the backing disc may be selected to be in a range of from 35 to 500 megapascals (MPa), more typically in a range of from 175 to 475 MPa, although this is not a requirement.

To help prevent snagging and breaking, the impact resistance of the laminated backing disc may be at least 0.1 joule (for example, in a range of from 0.3 to 1 joule), although this is not a requirement. Typically, the backing disc has a thickness of from 30 to 100 mils (0.25 to 2.5 millimeters), although this is not a requirement. The backing disc may optionally have additional treatments thereon such as, for example, an antistatic treatment opposite the abrasive layer.

Figure 2:
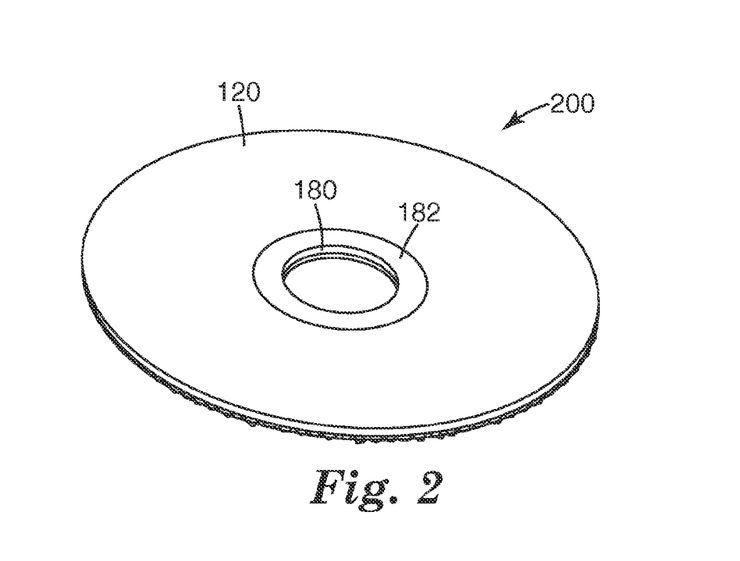
FIG. 2 is a perspective view of an exemplary coated abrasive laminate disc according to one embodiment of the present invention.
Figure 3:
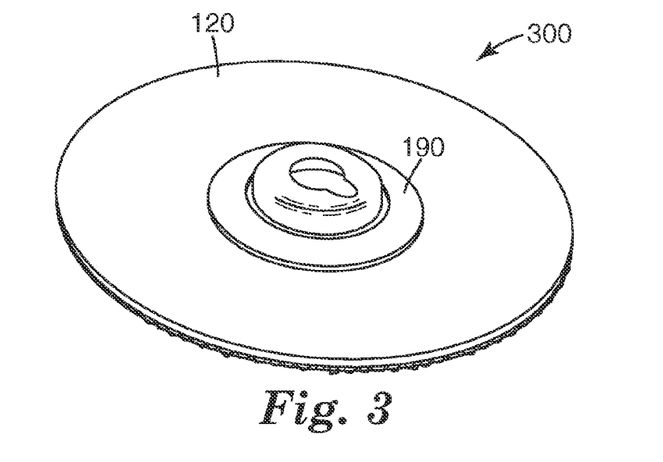
FIG. 3 is a perspective view of another exemplary coated abrasive laminate disc according to one embodiment of the present invention.

Coated abrasive laminate discs may be provided in various forms, for example, as shown in FIGS. 2 and 3.

In some embodiments of coated abrasive laminate disc 200, as shown in FIG. 2, backing disc 120 has a central opening 180, optionally fitted with metal reinforcing collar 182.

In some embodiments of coated abrasive laminate disc 300, as shown in FIG. 3, backing disc 120 has a centrally located attachment device 190. Examples of suitable attachment devices include Tinnerman nuts, threaded posts, and other quick-connect fasteners.

For some coated abrasive disc applications, it is advantageous to have a disc with a surface profile other than flat. It is often useful to have a slightly rolled edge to the disc to facilitate abrading into inside corners for instance. The coated abrasive laminate discs may be thermoformed into various desirable surface profiles. This can be done, for example, by placing the disc in a heated press having platens with suitable profiles until the laminating adhesive softens, cooling until the new shape is stabilized, and then removing the disc from the press. In another method, the disc may be heated outside the press first to soften the laminating adhesive, and then placed in a cooled press to establish and stabilize the new profile. The lamination and thermoforming processes may also be combined in several of the methods of making where lamination is done with components already converted to disc form.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the Examples and the rest of the specification are by weight.
Swing Arm Delamination Test Procedure:

This test procedure simulates the heat and grinding forces generated during heavy continuous disc grinding operations and is used to determine whether a laminating adhesive would maintain bond integrity under these conditions.

The abrasive disc to be evaluated is attached to a 20.3-cm ribbed circular backup plate, commercially available under the trade designation "DISC PAD FACE PLATE-RIBBED, PART NO. 05144-80515 HARD" from 3M Company, St. Paul, Minn. The backup plate is then secured to a testing device obtained under the trade designation "SWING ARM TESTER" from Reel Manufacturing, Centerville, Minn., using a metal screw fastener. Four ganged 14-gauge (1.9 mm) 1010 steel disc-shaped work pieces with a 30.5 cm diameter and 1.897 mm thickness are weighed and secured to the testing device with a metal fastener. During each test, the steel workpiece is applied to the abrasive article disc with a load of 8000 grams. The abrasive article disc is rotated at 3500 revolutions per minute (rpm), and the workpiece is placed against the disc at an angle of 5 degrees for a single 5-minute interval, while the workpiece is rotated at 2 rpm. Immediately at the end of the test cycle, the lamination bond of the disc is inspected for delamination and for melted adhesive by inserting the edge of a utility knife into the bond line. The lamination bond is rated "pass" if the bond was intact and the adhesive unmelted or "fail" if there was delamination or if the adhesive was found to have melted. The amount of steel removed (total swing-arm cut) and weight loss of each abrasive disc (that is, shelling) is recorded.
Stripback Peel Adhesion Test Procedure:

The laminated abrasive article to be tested is converted into an about 8 cm wide by 25 cm long piece having one edge free of the lamination bond. One-half the length of a wooden board (17.8 cm by 7.6 cm by 0.6 cm) is coated with a hot melt laminating adhesive commercially available under the trade designation "JET-MELT HOT MELT ADHESIVE PG3779" from 3M Company. The adhesive is applied with a hot melt glue gun, commercially available under the trade designation "POLYGUN II HOT MELT APPLICATOR" from 3M Company. The side of the coated abrasive article bearing the abrasive particles is attached to the side of the board containing the hot laminating adhesive coating in such a manner that the 10 cm of the laminated abrasive article not having the laminate bond overhangs from the board. Pressure is applied such that the board and the coated abrasive article are intimately bonded.

At 25° C., the abrasive article to be tested is cut along a straight line on both sides of the article such that the width of the coated abrasive article is reduced to 5.1 cm. The resulting abrasive article/board composite is mounted horizontally in a fixture attached to the upper jaw of a tensile testing machine, commercially available under the trade designation "SINTECH 6 W" from MTS Systems Corp., Eden Prairie, Minn. Approximately one cm of the overhanging portion of the glass fabric layer of the laminated abrasive article is mounted into the lower jaw of the machine such that the distance between the jaws is 12.7 cm. The machine separates the jaws at a rate of 0.085 cm/second (cm/sec), with the saturated glass fabric being pulled at an angle of 90 degrees away from the wooden board so that a portion of the laminated abrasive article separates at the lamination interface. The force required for the separation (that is, stripback force) is reported in kilograms/centimeter (kg/cm). If the saturated glass fabric breaks during the test, indicating peel strengths in excess of the backing strength, the data is reported as "break".

Heavy Duty Offhand Grinding Test Procedure:

This test procedure measures the ability of a laminated abrasive disc construction to withstand heavy, continuous grinding, with the mechanical forces and heat generation this entails.

The abrasive disc to be evaluated is weighed and then attached to a back up plate commercially available under the trade designation "RED RIBBED DISC PAD FACE PLATE", part number 051144-80514, from 3M Company, attached to a Cleco right angle grinder, model number 760VL rated at 6000 rpm, obtained from Cooper Power Tools, Lexington, S.C.

A 1018 mild carbon steel workpiece having a width of 6 inches (15.25 cm) and a thickness of ⅜ inch (0.95 cm) is weighed and clamped in a vertical position to a work table. The abrasive disc is used to abrade the workpiece under heavy manual pressure, at a 45 degree angle relative to the width of the workpiece, with the pad tipped at a shallow angle, traversing the abrasive back and forth across the workpiece as stock is removed. When the 45 degree bevel being created has completely traversed the thickness of the workpiece, the grinder is lifted and grinding continued with the abrasive disc in a horizontal position, again tipped at a shallow angle, grinding the bevel down until it is again flat. The cycle is repeated, alternately forming and removing bevels on the workpiece.

After a total of 5 minutes of continuous grinding cycles, the test is stopped. The abrasive article is inspected for damage, delamination or excessive shelling. The workpiece is weighed, and a total stock removal or "cut" is calculated. The abrasive disc is removed from the grinder and weighed and a disc weight loss is calculated and reported as "shelling."

Materials:

Table 1 (below) lists abbreviations for materials used in the Examples.

TABLE 1

| ABBREVIATION | DESCRIPTION |
|---|---|
| AB1 | a grade 36, Y-weight polyester cloth-backed abrasive incorporating double-coated ceramic aluminum oxide and brown aluminum oxide minerals available under the trade designation "974F" from 3M Company, St Paul, MN |
| CUR | 2-propylimidazole, available under the trade designation "ACTIRON NXJ-60 LIQUID" from Synthron, Morganton, NC |
| DICY | dicyandiamide, average particle size of less than 10 micrometers, available under the trade designation "AMICURE CG-1400" from Air Products and Chemicals, Allentown, PA. |
| EGS | an epoxy glass saturant comprising 84.5 percent EP1, 9.0 percent DICY, and 5.5 percent NOV, mixed and catalyzed with 0.75 percent of CUR. |
| EP1 | bisphenol A epoxy-functional material, obtained under the trade designation "EPON 828" from Resolution Performance Products, Houston, TX |
| GF1 | untreated woven glass fabric, 14.23 oz/sq yd (0.483 kg/m$^2$), satin weave, 48 × 32 count, available under the trade designation "STYLE 3732", from BGF Industries, Inc., Greensboro, NC |
| GF2 | GF1 treated with PGS at 20 percent dry add-on weight and cured with two trips through a cure oven. The first trip cured for 1 minute each at 120, 140, and 150° C. The second trip cured for 2 minutes each at 150, 170, and 190° C. |
| GF3 | GF1 treated with EGS at a coating weight 150 grams per square meter and cured for 2 hours at 120° C. |
| LA1 | an ether polyurethane adhesive film, with a durometer of 87 Shore A, a melting range of 171-193° C., nominal thickness of 0.127 mm, available under the trade designation "ST1880" from Stevens Urethanes, Greenville, SC |
| LA2 | an ester polyurethane adhesive film, with a durometer of 95 Shore A, a melting range of 160-170° C., nominal thickness of 0.152, available under the trade designation "SS1495SL" from Stevens Urethanes |
| LA3 | an ether polyurethane adhesive film, with a durometer of 85 Shore A, a melting range of 160-170° C., nominal thickness of 0.127 mm, available under the trade designation "ST1522CL" from Stevens Urethanes |
| LA4 | an polyamide adhesive film with melting point onset of 116° C., nominal thickness of 0.127 mm, available under the trade designation "4220" from Bemis Corp., Shirley, MA |

TABLE 1-continued

| ABBREVIATION | DESCRIPTION |
|---|---|
| LA5 | a polyamide in pellet form with a melting point range of 145-160° C., available under the trade designation "GRILTEX 1523A" from EMS Chemie, Sumter, SC |
| LA6 | a polyamide in pellet form with a tensile strength of 40 MPa (ISO 527), melting point range of 125-135° C., available under the trade designation "GRILTEX 1330A" from EMS Chemie |
| LA7 | a polyamide in pellet form with a tensile strength of 40 MPa (ISO 527), melting point range of 110-120° C., available under the trade designation "GRILTEX 3A" from EMS Chemie |
| LA8 | a polyurethane adhesive film with melting point onset of 124° C., nominal thickness of 0.051 mm, available under the trade designation "3410" from Bemis Corp. |
| LA9 | a polyurethane adhesive film with melting point onset of 120° C., nominal thickness of 0.152, available under the trade designation "3405" from Bemis Corp. |
| LA10 | a polyester adhesive film with a tensile strength of 6000 psi (41 MPa) (ASTM D-412), a melting point onset of 155° C., nominal thickness of 0.051 mm, available under the trade designation "3505" from Bemis Corp. |
| LA11 | a polyester adhesive film with melting point onset of 125° C., nominal thickness of 0.076 mm, available under the trade designation "5250" from Bemis Corp. |
| LA12 | a polyester in powder form with a melting point range of 120-130° C., available under the trade designation "GRILTEX 1441E" from EMS Chemie |
| LA13 | a polyester in powder form with a tensile strength of 20 MPa (ISO 527), melting point range of 145-155° C., available under the trade designation "GRILTEX 1309E" from EMS Chemie |
| LA14 | a polyester in powder form with a melting point range of 150-160° C., available under the trade designation "GRILTEX 1377E" from EMS Chemie |
| LA15 | a nylon 6 polymer in pellet form having a melting point onset of 220° C., available under the trade designation "ULTRAMID B3", from BASF, Wyandotte, MI |
| LA16 | a polyamide in pellet form with a tensile strength of 30 MPa (ISO 527), melting point range of 105-115° C., available under the trade designation "GRILTEX 1A" from EMS Chemie |
| NOV | novolac resin, available under the trade designation "RUTAPHEN 8656F" from Bakelite AG, Frielendorf, Germany |
| PGS | a 75 percent aqueous solution of phenol-formaldehyde resin having a phenol to formaldehyde ratio of 1.5-2.1:1, catalyzed with 2.5 percent potassium hydroxide. |

Lamination:

Lamination Adhesive Preparation Method A: for lamination adhesives purchased as films, the film is used as received. For thin films, multiple layers are used to obtain a total film thickness of 4 to 6 mils (0.1-0.15 mm).

Lamination Adhesive Preparation Method B: for lamination adhesives purchased as pellets, films of between 4 and 6 mils (0.1-0.15 mm) in thickness are prepared by extrusion through a slot die onto a chilled roll or onto a removable substrate on a chilled roll.

Lamination Adhesive Preparation Method C: for lamination adhesives purchased as powders, the adhesive is manually applied to an 8.5 by 8.5 inch (21.6 by 21.6 cm) square of the appropriately treated glass fabric with a sieve to a weight corresponding to a 6 mil (0.15 mm) equivalent film thickness. The powder is then melted to a continuous film by placing the powder-coated glass fabric (powder side up) on a plate heated to above the melting point of the polymer until all of the powder is melted.

Lamination Method: The abrasive sheet AB1, laminating adhesive film and treated glass backing (or laminating adhesive coated treated glass backing for Preparation Method C) are placed in a heated platen press commercially available under the trade designation "NIX model N-800" from NIX Corporation, Pittsburg, Kans., with the treated glass fabric portion proximate to the heated press platen. Both sides of the laminate precursor are covered with paper release liners. For peel test samples, an additional strip of release liner is inserted into one edge of the laminate precursor, between AB1 and the laminating adhesive to allow easy initiation of the peel during testing. The press is pre-heated to a temperature sufficiently above the melting point of the laminating adhesive to melt it completely in the allotted time. The gauge pressure on the press platen is set to 40 psi (275 kPa). The press is closed for a time sufficient to melt the adhesive. Upon opening, the laminate and associated release liners are pulled from the press and placed under a metal plate with a manually applied downward force of approximately 15 kg for approximately 10 seconds. The resultant coated abrasive laminate is then allowed to stand for at least 30 additional seconds under the metal plate with a downward force of 1.5 kg. At this point, the adhesive is solidified, and the release liners are removed.

Disc Converting Method:

Coated abrasive laminate discs (7-inch (18-cm) diameter) with ⅞-inch (2.2-cm) center holes are cut from the various laminated samples using a die rule cutter and a hydraulic press.

Examples 1-6 and Comparative Examples A-V

Table 2 provides a summary of the laminating adhesive polymer class and physical properties for each of the Examples and Comparative Examples.

Coated abrasive laminate examples 1-6 and Comparative Examples A-V were prepared using the ingredients and lamination conditions as reported in Tables 3 and 4. Abrasive discs, 7-inch (18-cm) diameter×⅞-inch (2.2-cm) center hole, were cut from the coated abrasive laminates as described in the Disc Converting Method. Examples 1-6 and Comparative Examples A-V were tested according to the Swing Arm Delamination Test Procedure. The test results are reported in Table 3. Examples 1-6 and Comparative Examples A-V were tested for adhesive bond integrity using the Stripback Peel Adhesion Test Procedure. The results of this test are reported in Table 4. Examples 1-6 and selected Comparative Examples were tested with the Offhand Heavy Grinding Test Procedure. The results are shown in Table 5.

TABLE 2

| | LAMINATING ADHESIVE | LAMINATING ADHESIVE CLASS | ADHESIVE MELTING ONSET OR RANGE (° C.) | TENSILE STRENGTH (MPa) OR DUROMETER |
|---|---|---|---|---|
| Example 1 | LA1 | ether polyurethane | 171-193 | 87 Shore A |
| Example 2 | LA1 | ether polyurethane | 171-193 | 87 Shore A |
| Example 3 | LA2 | ester polyurethane | 160-170 | 95 Shore A |
| Example 4 | LA2 | ester polyurethane | 160-170 | 95 Shore A |
| Example 5 | LA5 | polyamide | 145-160 | >20 |
| Example 6 | LA5 | polyamide | 145-160 | >20 |
| Comparative Example A | LA3 | ether polyurethane | 160-170 | 85 Shore A |
| Comparative Example B | LA3 | ether polyurethane | 160-170 | 85 Shore A |
| Comparative Example C | LA4 | polyamide | 116 | no data |
| Comparative Example D | LA4 | polyamide | 116 | no data |
| Comparative Example E | LA6 | polyamide | 125-135 | 40 |
| Comparative Example F | LA6 | polyamide | 125-135 | 40 |
| Comparative Example G | LA7 | polyamide | 110-120 | 40 |
| Comparative Example H | LA7 | polyamide | 110-120 | 40 |
| Comparative Example I | LA8 | polyurethane | 124 | no data |
| Comparative Example J | LA8 | polyurethane | 124 | no data |
| Comparative Example K | LA9 | polyurethane | 120 | no data |
| Comparative Example L | LA9 | polyurethane | 120 | no data |
| Comparative Example M | LA10 | polyester | 155 | 41 |
| Comparative Example N | LA11 | polyester | 155 | 41 |
| Comparative Example O | LA12 | polyester | 120-130 | no data |
| Comparative Example P | LA12 | polyester | 120-130 | no data |
| Comparative Example Q | LA13 | polyester | 145-155 | 20 |
| Comparative Example R | LA13 | polyester | 145-155 | 20 |
| Comparative Example S | LA14 | polyester | 150-160 | no data |
| Comparative Example T | LA14 | polyester | 150-160 | no data |
| Comparative Example U | LA15 | polyamide | 220 | no data |
| Comparative Example V | LA16 | polyamide | 105-115 | 30 |

TABLE 3

| | WOVEN BACKED ABRASIVE | GLASS FABRIC | LAMINATING ADHESIVE | LAMINATION ADHESIVE PREPARATION METHOD | LAMINATION TIME, minutes | LAMINATION TEMPERATURE, ° C. | SWING ARM DELAMINATION TEST, 1st trial, 2nd trial |
|---|---|---|---|---|---|---|---|
| Example 1 | AB1 | GF2 | LA1 | A | 2 | 205 | pass, pass |
| Example 2 | AB1 | GF3 | LA1 | A | 2 | 205 | pass, pass |
| Example 3 | AB1 | GF2 | LA2 | A | 2 | 205 | pass, pass |
| Example 4 | AB1 | GF3 | LA2 | A | 2 | 205 | pass, pass |
| Example 5 | AB1 | GF2 | LA5 | B | 1 | 190 | pass, pass |
| Example 6 | AB1 | GF3 | LA5 | B | 1 | 190 | fail, pass |
| Comparative Example A | AB1 | GF2 | LA3 | A | 2 | 205 | fail, fail |
| Comparative Example B | AB1 | GF3 | LA3 | A | 2 | 205 | fail, fail |
| Comparative Example C | AB1 | GF2 | LA4 | A | 1 | 190 | fail, fail |
| Comparative Example D | AB1 | GF3 | LA4 | A | 1 | 190 | fail, fail |
| Comparative Example E | AB1 | GF2 | LA6 | B | 1 | 190 | pass, fail |
| Comparative Example F | AB1 | GF3 | LA6 | B | 1 | 190 | fail, fail |
| Comparative Example G | AB1 | GF2 | LA7 | B | 1 | 190 | fail, pass |
| Comparative Example H | AB1 | GF3 | LA7 | B | 1 | 190 | fail, fail |
| Comparative Example I | AB1 | GF2 | LA8 | A | 1 | 190 | fail, fail |
| Comparative Example J | AB1 | GF3 | LA8 | A | 1 | 190 | fail, fail |
| Comparative Example K | AB1 | GF2 | LA9 | A | 1 | 190 | fail, fail |

TABLE 3-continued

|  | WOVEN BACKED ABRASIVE | GLASS FABRIC | LAMINATING ADHESIVE | LAMINATION ADHESIVE PREPARATION METHOD | LAMINATION TIME, minutes | LAMINATION TEMPERATURE, °C. | SWING ARM DELAMINATION TEST, 1st trial, 2nd trial |
|---|---|---|---|---|---|---|---|
| Comparative Example L | AB1 | GF3 | LA9 | A | 1 | 190 | fail, fail |
| Comparative Example M | AB1 | GF2 | LA10 | A | 1 | 190 | fail, fail |
| Comparative Example N | AB1 | GF2 | LA11 | A | 1 | 190 | fail, fail |
| Comparative Example O | AB1 | GF2 | LA12 | C | 1 | 190 | conversion failure, conversion failure |
| Comparative Example P | AB1 | GF3 | LA12 | C | 1 | 190 | conversion failure, conversion failure |
| Comparative Example Q | AB1 | GF2 | LA13 | C | 1 | 190 | conversion failure, conversion failure |
| Comparative Example R | AB1 | GF3 | LA13 | C | 1 | 190 | conversion failure, conversion failure |
| Comparative Example S | AB1 | GF2 | LA14 | C | 1 | 205 | conversion failure, conversion failure |
| Comparative Example T | AB1 | GF3 | LA14 | C | 1 | 205 | conversion failure, conversion failure |
| Comparative Example U | AB1 | GF2 | LA15 | B | 3 | 205 | no bond formed |
| Comparative Example V | AB1 | GF3 | LA16 | B | .75 | 177 | no data |

TABLE 4

|  | WOVEN BACKED ABRASIVE | GLASS FABRIC | LAMINATING ADHESIVE | LAMINATION ADHESIVE PREPARATION METHOD | LAMINATION TIME, minutes | LAMINATION TEMPERATURE, °C. | STRIPBACK PEEL STRENGTH, kilograms per centimeter width | |
|---|---|---|---|---|---|---|---|---|
| Example 1 | AB1 | GF2 | LA1 | A | 2 | 205 | 1.66 | 1.65 |
| Example 2 | AB1 | GF3 | LA1 | A | 2 | 205 | 0.86 | 0.73 |
| Example 3 | AB1 | GF2 | LA2 | A | 2 | 205 | 1.74 | 1.66 |
| Example 4 | AB1 | GF3 | LA2 | A | 2 | 205 | 1.29 | 1.23 |
| Example 5 | AB1 | GF2 | LA5 | B | 1 | 190 | 1.04 | 1.17 |
| Example 6 | AB1 | GF3 | LA5 | B | 1 | 190 | break | break |
| Comparative Example A | AB1 | GF2 | LA3 | A | 2 | 205 | 1.91 | 1.86 |
| Comparative Example B | AB1 | GF3 | LA3 | A | 2 | 205 | 0.89 | 0.86 |
| Comparative Example C | AB1 | GF2 | LA4 | A | 1 | 190 | break | 3.56 |
| Comparative Example D | AB1 | GF3 | LA4 | A | 1 | 190 | 2.92 | 2.77 |
| Comparative Example E | AB1 | GF2 | LA6 | B | 1 | 190 | break | 5.26 |
| Comparative Example F | AB1 | GF3 | LA6 | B | 1 | 190 | 3.29 | 3.47 |
| Comparative Example G | AB1 | GF2 | LA7 | B | 1 | 190 | 4.29 | break |
| Comparative Example H | AB1 | GF3 | LA7 | B | 1 | 190 | 2.58 | 2.72 |
| Comparative Example I | AB1 | GF2 | LA8 | A | 1 | 190 | 0.95 | 0.91 |
| Comparative Example J | AB1 | GF3 | LA8 | A | 1 | 190 | 0.61 | 0.63 |
| Comparative Example K | AB1 | GF2 | LA 9 | A | 1 | 190 | 2.20 | break |
| Comparative Example L | AB1 | GF3 | LA9 | A | 1 | 190 | 2.02 | 2.00 |
| Comparative Example M | AB1 | GF2 | LA10 | A | 1 | 190 | no data | no data |
| Comparative Example N | AB1 | GF2 | LA11 | A | 1 | 190 | no data | no data |
| Comparative Example O | AB1 | GF2 | LA12 | C | 1 | 190 | 0.09 | 0.09 |
| Comparative Example P | AB1 | GF3 | LA12 | C | 1 | 190 | 0.14 | 0.14 |
| Comparative Example Q | AB1 | GF2 | LA13 | C | 1 | 190 | 0.07 | 0.05 |
| Comparative Example R | AB1 | GF3 | LA13 | C | 1 | 190 | 0.21 | 0.20 |

TABLE 4-continued

|  | WOVEN BACKED ABRASIVE | GLASS FABRIC | LAMINATING ADHESIVE | LAMINATION ADHESIVE PREPARATION METHOD | LAMINATION TIME, minutes | LAMINATION TEMPERATURE, ° C. | STRIPBACK PEEL STRENGTH, kilograms per centimeter width | |
|---|---|---|---|---|---|---|---|---|
| Comparative Example S | AB1 | GF2 | LA14 | C | 1 | 205 | 0 | 0 |
| Comparative Example T | AB1 | GF3 | LA14 | C | 1 | 205 | 0.41 | 0.45 |
| Comparative Example U | AB1 | GF2 | LA15 | B | 3 | 205 | no data | no data |
| Comparative Example V | AB1 | GF3 | LA16 | B | .75 | 177 | no data | no data |

TABLE 5

|  | | | HEAVY DUTY OFFHAND TEST RESULTS | | |
|---|---|---|---|---|---|
|  | LAMINATING ADHESIVE | GLASS FABRIC | LAMINATION INTEGRITY | CUT, grams | SHELLING, grams |
| Example 6 | LA5 | GF3 | no visual evidence of failure | 544 | 5 |
| Comparative Example F | LA6 | GF3 | visual evidence of adhesive melting but no delamination | 529 | 6 |
| Comparative Example V | LA16 | GF3 | visual evidence of melting and delamination | 372 | disc edge fell apart |

Various modifications and alterations of this invention may be made by those skilled in the art without departing from the scope and spirit of this invention, and it should be understood that this invention is not to be unduly limited to the illustrative embodiments set forth herein.

What is claimed is:

1. A coated abrasive laminate disc comprising:
   a backing disc, the backing disc comprising:
   a woven fabric, wherein the woven fabric comprises polyester;
   a woven glass fabric comprising glass fibers having a first fabric treatment comprising a first saturant, wherein the first saturant is selected from the group consisting of phenolics, aminoplasts, epoxies, and combinations thereof; and
   a thermoplastic laminating adhesive disposed between the woven fabric and the woven glass fabric, the thermoplastic laminating adhesive securing the woven fabric to the woven glass fabric, wherein the thermoplastic laminating adhesive has a melting onset temperature in a range of from about 140° C. to 190° C., inclusive, and comprises:
   a polyamide having a tensile strength of at least 20 megapascals; or
   a polyurethane having a Shore A durometer of at least 87; or
   a combination thereof; and
   an abrasive layer secured to the backing proximate to the woven fabric, the abrasive layer comprising at least one binder and abrasive particles.

2. The coated abrasive laminate disc of claim 1, wherein the abrasive layer comprises a make layer and a size layer.

3. The coated abrasive laminate disc of claim 2, further comprising a supersize layer overlaying at least a portion of the size layer.

4. The coated abrasive laminate disc of claim 1, wherein the glass fabric has a basis weight of from 2 to 20 ounces per square yard.

5. The coated abrasive laminate disc of claim 1, wherein the woven fabric has a basis weight of from 2 to 20 ounces per square yard.

6. The coated abrasive laminate disc of claim 1, wherein the woven fabric further comprises a second fabric treatment selected from the group consisting of: a backsize, a presize, a second saturant, and combinations thereof.

7. The coated abrasive laminate disc of claim 1, wherein the backing disc has a thickness of from 10 to 100 mils.

8. The coated abrasive laminate disc of claim 1, wherein the backing disc further has a central opening therein.

9. The coated abrasive laminate disc of claim 1, further comprising a centrally located attachment device affixed to the glass fabric.

10. The coated abrasive laminate disc of claim 1, wherein the laminating adhesive comprises the polyamide.

* * * * *